Jan. 20, 1931.   J. V. OSTLUND   1,789,830
DRILL HOLDER
Filed Sept. 28, 1927

INVENTOR
JOHN V. OSTLUND.
BY
ATTORNEY

Patented Jan. 20, 1931

1,789,830

UNITED STATES PATENT OFFICE

JOHN V. OSTLUND, OF NEWCASTLE, INDIANA

DRILL HOLDER

Application filed September 28, 1927. Serial No. 222,498.

This invention relates to a drill holding and driving means and is best adapted for use on machines wherein the drill driving spindle and drill are withdrawn from the piece worked upon by positive power.

One of the objects of my invention is to provide a driving means that will shear off when subject to twisting strains greater than the drill being driven can stand.

Further objects are to provide a resilient means for withdrawing the drill from the finished hole and to provide holding means associated with said resilient withdrawing means, so built as to shear off if the drill sticks in the hole and offers too great a resistance to being withdrawn.

It is also desirable to provide a means for automatically centering the drill driving collet when the drill point has entered a guide bushing. These and further objects will be better explained in the specification taken in connection with the drawings wherein.

Figure 1:
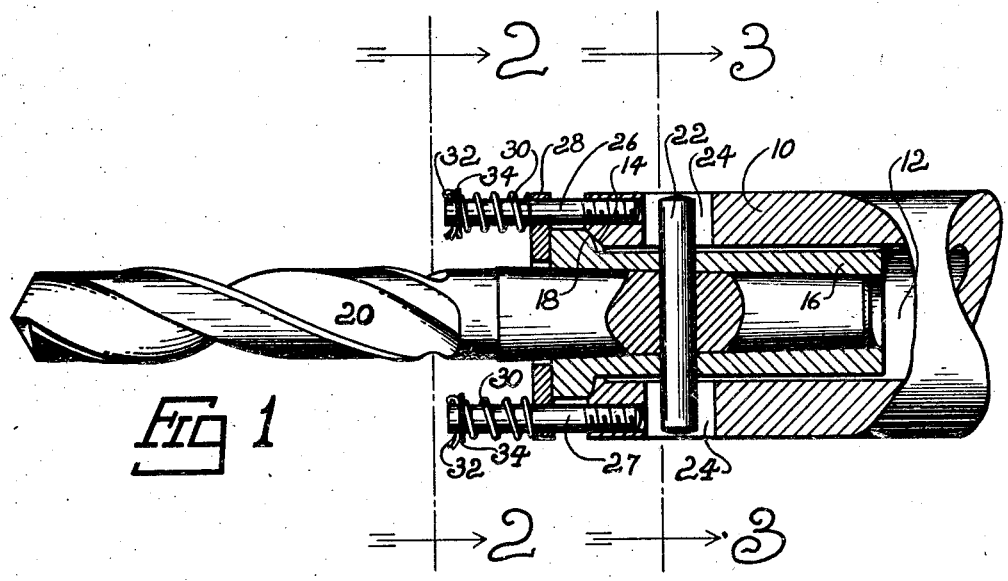
Fig. 1 is a side view, partly in section, of a drill, a drill holder and a driving spindle embodying my invention.
Figure 2:
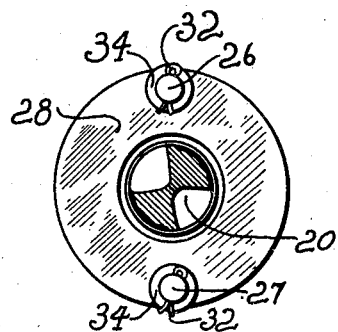
Fig. 2 is a view taken on line 2—2 of Fig. 1.
Figure 3:
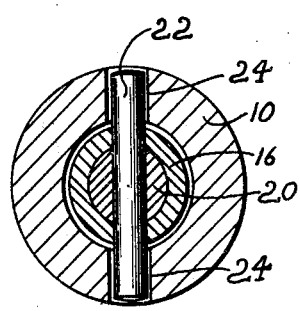
Fig. 3 is a sectional view taken on line 3—3 of Fig. 1.

Referring to the drawings, there is shown a driving spindle 10 which may be attached to the turret of an automatic lathe, a drill press spindle or the spindle of any machine with which it is desirable to feed a tool into and out of a piece of work being operated upon.

The shaft 10 has a hole 12 thru it and the entrance to the hole 12 is chamfered as at 14. A drill holding collet 16 rides within the hole 12 and is centered therein by a curved shoulder 18 which centers on the chamfer 14. A drill 20 is held in the collet 16 by a pin 22 which extends into slots 24 of a spindle 10 and serves as a driving means between the spindle 10 and drill 20.

Screwed into the end of the spindle 10 are two studs 26 and 27. Slidably mounted on the studs 26 and 27 is a circular collar 28 which is forced against the drill collet 16 by a spring 30 on each stud. A cotter pin 32 and washer 34 are secured on each stud to act as spring retainers. In operation the drill 20 is driven by the spindle 10 thru the pin 22. The springs 30, in cooperation with the plate 28, tend to keep the drill and collet acurately centered in the spindle 10 by forming the shoulder 18 against the chamfer 14 in the spindle 10. The driving pin 22 is made of a material of low shearing strength so that if the drill should bind the pin will shear off and no harm will be done to the drill. The diameter and shearing strength of the pin 22 will depend upon the size and strength of the drill 20.

In machining the chamfer 14 on the shaft 10, a boring tool, not shown, is placed in a chuck and the chamfer cut radially on the center line of the chuck. This assures perfect alignment of the collet 16 regardless of the center line thru the shaft.

Assuming the drill 20 to be stuck in the work and the pin 22 to have sheared off. The spindle 10 will be moved to the right thereby compressing the springs 30 until the collar 28 causes the cotter pins 32 to shear off thus allowing the spindle 10 to return to its normal position.

While I have shown what I deem to be the preferred form of my invention it is to be understood that various changes may be made without departing from the spirit of my invention and that it is not my intention to limit its scope other than by the terms of the appended claims.

What I claim is:

1. A device of the class described comprising a hollow spindle, a tool holding sleeve loosely fitting the opening in said spindle, resilient means secured to the end of said spindle and adapted to urge said sleeve into said hollow spindle and a pin passing thru said spindle, sleeve and tool to hold the tool in the sleeve and to act as a driving means between the spindle and the sleeve and tool.

2. A device of the class described comprising a hollow spindle, a tool holding sleeve loosely fitting the opening in said spindle, a tool in said sleeve, a curved shoulder on said sleeve adapted to engage the outer edge of said spindle, studs in the end of said spindle, a plate surrounding said tool and abutting against said sleeve, springs on said studs for forcing said plate against said sleeve to urge said sleeve against said spindle, a pin thru said sleeve and tool to secure said tool within said sleeve, said spindle having slots in the wall thereof of said spindle thru which said pin projects and forms a driving means between said spindle and sleeve, said slots allowing free axial movement of the tool, sleeve and pin in respect to the spindle.

JOHN V. OSTLUND.